Nov. 3, 1970 S. C. RICHARDSON 3,538,437
APPARATUS FOR MEASUREMENT AND ANALYSIS OF VOLTAGE
WAVES INCLUDING SHORT DURATION TRANSIENTS
Filed Sept. 26, 1968 2 Sheets-Sheet 1

Inventor:
Sheldon C. Richardson,
by Louis A. Moncha

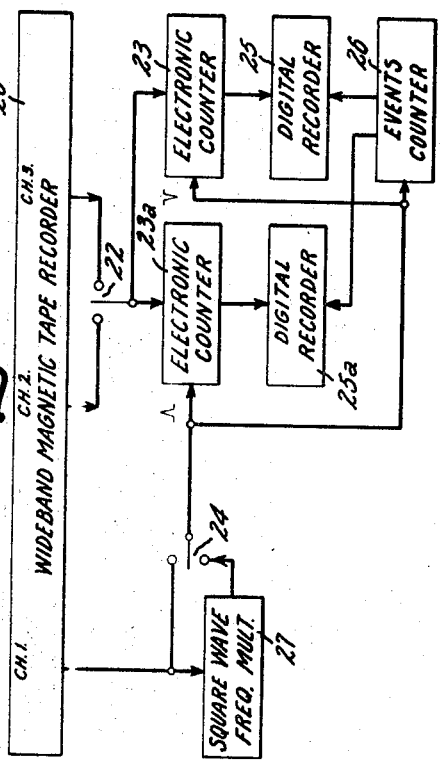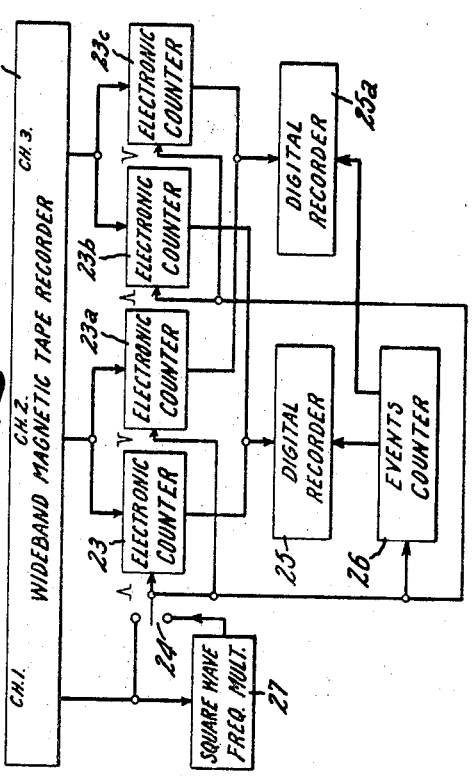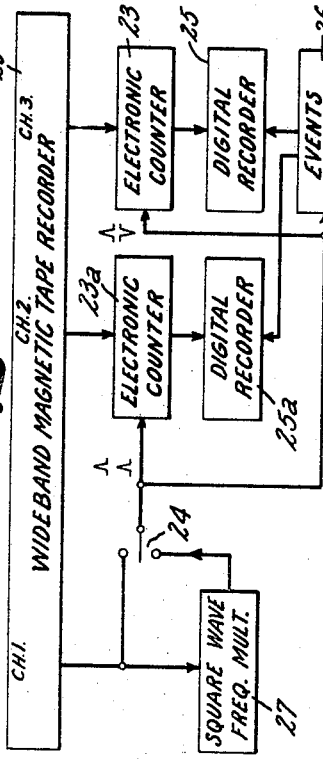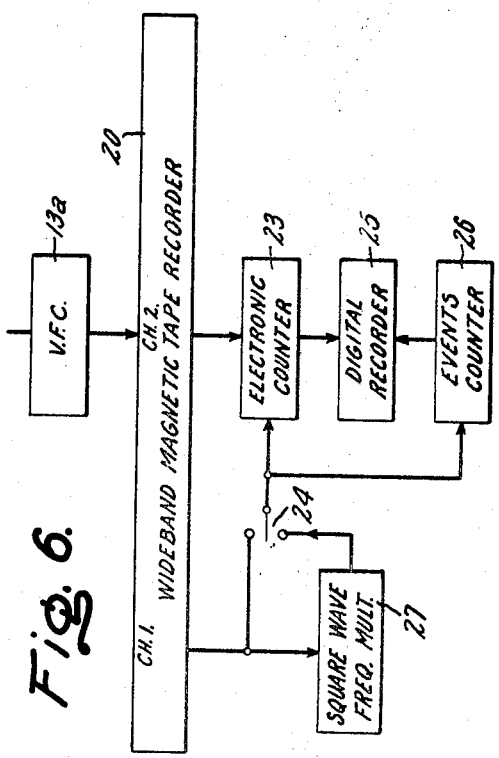

United States Patent Office 3,538,437
Patented Nov. 3, 1970

3,538,437
APPARATUS FOR MEASUREMENT AND ANALYSIS OF VOLTAGE WAVES INCLUDING SHORT DURATION TRANSIENTS
Sheldon C. Richardson, Scotia, N.Y., assignor to General Electric Company, a corporation of New York
Filed Sept. 26, 1968, Ser. No. 762,796
Int. Cl. G01r 23/16
U.S. Cl. 324—77                                 16 Claims

ABSTRACT OF THE DISCLOSURE

An electrical apparatus for measuring and analyzing voltage waves such as 60 cycle power system voltage includes electrical components for generating electrical pulses wherein the number of pulses is directly proportional to the average value of a difference voltage indicative of voltage deviation during a predetermined time interval of a monitored voltage wave from a reference voltage wave representing the ideal conditions of the monitored wave. The pulses are recorded on a tape recorder and subsequently reproduced and counted by an electronic counter gated to count during alternate fundamental frequency half cycle intervals of the monitored voltage. A digital recorder displays the output of the counter. The counter can also be gated at higher frequencies to obtain higher sampling rates during intervals of abnormal conditions of the monitored wave for analyzing fractions of the fundamental frequency half cycle intervals of the wave to thereby obtain a more accurate analysis of the deviations from the ideal wave shape.

My invention relates to electrical apparatus for the measurement and analysis of voltage waves, and in particular, to apparatus for analyzing the deviations of a monitored voltage from the normal wave shape over short intervals of time corresponding to fractions of a half cycle of the monitored wave.

Apparatus for the measurement and analysis of voltage waves finds many uses such as in electric power systems and various types of electronic laboratory test equipment. The results of the measurement and analysis of voltage wave shapes under abnormal conditions thereof often indicates the reason for the abnormal condition. Conventional voltage wave shape test apparatus is adapted for measuring harmonic distortion but rarely is capable of measuring short duration transient disturbances, and in the latter case, only with moderate degree of accuracy, at best.

Therefore, one of the principal objects of my invention is to provide an electrical apparatus for measuring and analyzing deviations of a monitored voltage wave from the normal or ideal condition thereof.

Another object of my invention is to provide measurement and analysis of the deviations of the monitored voltage wave over half cycles thereof.

A still further object of my invention is to provide measurement and analysis of the deviations of the voltage wave over shorter intervals of time corresponding to a particular fraction of a half cycle of the fundamental frequency of the monitored wave to thereby obtain a more accurate analysis of the deviations from the normal wave shape.

Briefly described, my invention comprises electrical apparatus for comparing a monitored voltage wave to a reference voltage wave representing the normal or ideal conditions of the monitored wave, and for generating electrical pulses wherein the number of pulses is directly proportional to the average value of the polarity-sensitive difference voltage of the two waves. A pulse counter gated at the fundamental frequency of the monitored voltage counts the pulses during alternate half cycles thereof. The counter may also be gated at higher frequencies to obtain pulse counting over shorter intervals of time corresponding to particular fractions of a half cycle of the fundamental frequency of the monitored wave. The suppression of the fundamental frequency of the monitored wave shape and the small incremental measurements provided by the higher frequency gating of the counter results in increased accuracy of the voltage wave measurement and analysis, especially for short duration transients.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

FIG. 3 is a block diagram of a second embodiment of my invention;

FIG. 4 is a block diagram of a third embodiment of my invention;

FIG. 5 is a block diagram of a fourth embodiment of my invention; and

FIG. 6 is a block diagram of a fifth embodiment of my invention.

Figure 1:
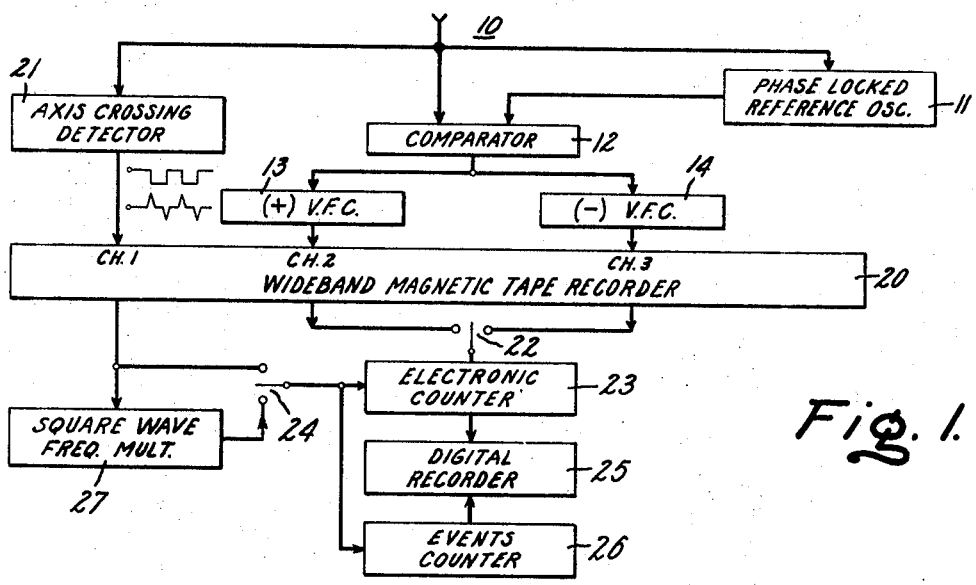
FIG. 1 is a block diagram representation of a first embodiment of my invention.

Referring now in particular to FIG. 1, there is shown a first embodiment of my invention in block diagram form and is the preferred embodiment in that it employs a minimum number of circuit components and yields a reasonable amount of information for the measurement and analysis of voltage waves. A source of voltage which wave shape thereof is to be measured and analyzed by the subject invention is indicated as a whole by numeral 10. This source of voltage may comprise an electric power system operating at 60 cycles per second or other frequencies, and is not limited to electric power systems. In fact, voltage source 10 may supply a voltage having any particular periodic wave shape wherein the normal or ideal wave shape thereof may be duplicated by a reference voltage generator 11 which forms a component of my apparatus. In the particular case wherein the monitored voltage is from a conventional electric power system, reference voltage generator 11 is a sine wave oscillator providing at its output a voltage of the same frequency as the monitored voltage from source 10. Reference oscillator 11 is phase-locked with the monitored voltage whereby the output thereof is also in phase with the monitored voltage. Phase-locked oscillator 11 and all of the other components to be hereinafter described are of conventional design and thus will merely be described in terms of the functions performed by such components.

The wave shapes of the monitored voltage and reference voltage are compared in a voltage comparator circuit 12 which provides at the output thereof a polarity-sensitive difference voltage indicative of the voltage deviation of the monitored voltage waves from the normal or ideal condition of such waves as defined by reference oscillator 11. The amplitude of the wave shape of the reference voltage is adjusted to the amplitude of the wave shape of the monitored voltage under normal conditions in the comparator circuit 12 whereby the fundamental frequency of the monitored voltage is suppressed at the output of the comparator circuit 12 and only the polarity-sensitive difference voltage provided thereat.

Figure 2:
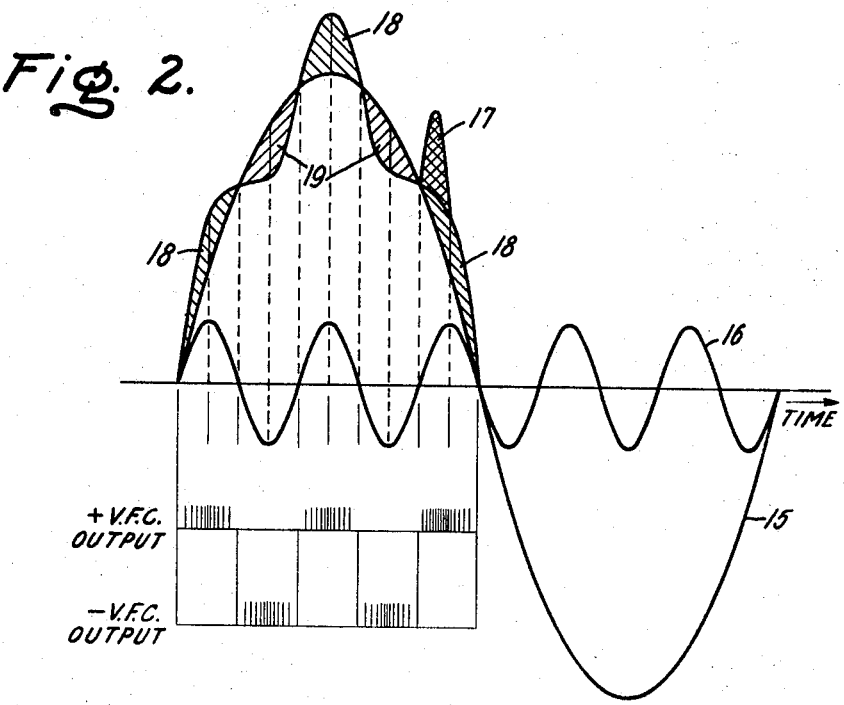
FIG. 2 is a graphical representation of the pulses generated due to a spike transient and fifth harmonic distortion voltage.

The polarity-sensitive voltage at the output of comparator circuit 12 is supplied to the inputs of two polarity-sensitive voltage-to-frequency converters (VFC's) 13 and 14 of opposite polarity. Alternatively, the output of comparator circuit 12 may be supplied to the input of a single VFC having bi-polarity input and separate bi-polarity outputs. Components 13 and 14 convert the polarity-sensitive difference voltage to electrical pulses wherein the number of pulses is directly proportional to the magnitude of the polarity-sensitive difference voltage. Referring to FIG. 2, there is shown the wave shape of the reference voltage supplied from oscillator 11 and illustrated as sine wave 15. Sine wave 15 also corresponds to the monitored voltage from source 10 under normal conditions thereof. In a particular example of the operation of my apparatus, the monitored voltage wave shape is distorted by a transient "spike" 17 occurring only during the time interval of $\frac{1}{20}$ cycle of the fundamental frequency of wave 15 and a fifth harmonic component 16. The distortion of the fundamental frequency wave shape is indicated by the various cross hatched areas, the distortion due to the positive half cycles of the fifth harmonic frequency being indicated by cross hatched areas 18 located on the outer side of the fundamental frequency sine wave shape and the distortion due to the negative half cycles of the fifth harmonic being indicated by cross hatched areas 19 on the inner side of the fundamental frequency wave. These cross hatched areas also represent the polarity-sensitive difference voltages measured by the comparator circuit 12 wherein the positive difference voltage is the voltage deviation indicative of a higher than normal voltage (cross hatched areas 17 and 18) and the negative difference voltage is indicative of an abnormally low voltage (cross hatched areas 19).

The operation of the VFC's 13 and 14 for the particular distorted wave shape illustrated in FIG. 2 is indicated by the plot of the outputs of the respective converters as series of pulses indicative of the polarity-sensitive difference voltage. The positive polarity converter 13 generates three series of pulses indicative of the positive voltage deviation caused by the positive half cycles of the fifth harmonic and the transient spike 17. The number of pulses in each series of pulses (i.e., the varying repetition rate thereof) is directly proportional to the magnitude of the difference voltage. Thus, at the zero crossing of the fifth harmonic there are no pulses generated by the converters and at peak amplitude thereof the pulses are generated at a relatively high repetition rate. Intermediate the zero crossing and peak amplitude points of the fifth harmonic the pulses have repetition rates varying in a sinusoidal manner with the exception of the particular interval of the transient spike voltage wave shape 17. The positive polarity transient 17 is superimposed on the fifth harmonic and this greater positive polarity voltage deviation is indicated in the third series of the +VFC output as a greater number of pulses during such transient interval.

The difference voltage in terms of the pulses generated by the converters 13 and 14 are supplied to, and recorded on, two channels designated CH. 2 and CH. 3 of a wide band magnetic tape recorder 20. Other recording and reproducing means may also be employed, however, the tape recorder is entirely satisfactory for the purposes.

A means for generating gating or time reference signals defining alternate half cycles and the output of such means 21 is supplied to another channel (CH. 1) of tape recorder 20. A suitable electronic circuit for providing the gating signals is an axis crossing detector, phase-locked to the monitored voltage, for providing unipolarity square wave pulses of half cycle duration corresponding to, and in phase with, the monitored voltage frequency. Alternatively, the axis crossing detector may provide bipolarity short duration pulses occurring at successive zero crossings of the monitored voltage. The tape recorder 20 thus records and stores three quantities, the zero axis crossing reference pulses providing a gating or time reference, and the two pulse outputs of the VFC's indicative of the magnitude and polarity of the voltage deviation of the monitored voltage from the normal conditions thereof.

The tape recorder 20 is subsequently operated in its reproduce mode for obtaining the measurement and analysis of the monitored voltage wave by means of measurement and analysis of the difference voltage. In the reproduce mode of the tape recorder operation, the stored series of pulses from the outputs of the VFC's are supplied to a "pulse count polarity selector switch" 22 which permits the connection to an input of an electronic pulse counter 23 selectively from channels 2 and 3 of the tape recorder. Also, the stored gating signals (square wave or short duration peak pulses) are supplied to a first position of "gating frequency selector switch" 24 from channel 1. Counter 23 is gated to its "on" state for counting the pulses from channels 2 or 3 and gated to its "off" state for stopping the counting process. The counter automatically resets itself to zero during the "off" state. In the case of square wave gating pulses, as illustrated at the output of axis crossing detector 21, it is assumed that the negative-going slope is the gate "on" signal and the positive-going slope is the gate "off" signal. Obviously these signals can be interchanged, and positive polarity square wave pulses may also be utilized. In like manner, in the case of short duration peak pulses as also illustrated, it is assumed that the positive pulse is the gate "on" signal and the negative pulse is the gate "off" signal for exemplary purposes only. Counter 23 is thus gated on during the intervals of alternate half cycles of the fundamental frequency of the monitored voltage wave (in the first position of switch 24) for counting the pulses from the output of one of the VFCs and subsequently (upon operating switch 22) for counting the pulses from the output of the other converter. During the intervals of the other of the alternate half cycles of the fundamental frequency of the monitored voltage wave, the counter 23 is reset to zero. Thus, the count developed over an alternate half cycle represents the average value of any difference or deviation voltage of positive polarity, and also the average value of any difference voltage of negative polarity.

The output of pulse counter 23 is connected to a suitable display or read-out means such as a digital recorder 25 for providing a visual indication in tabulated form of the alternate half cycle pulse count output of the two VFC's. A second electronic pulse counter 26, designated an "events" counter, provides for counting all of the alternate half cycle events (i.e., all of the gating on-to-off intervals for a period during which a particular analysis is being conducted). The output of events counter 26 is connected to another input of recorder 25 and the input to counter 26 is also provided from the axis crossing detector 21 through the tape recorder and switch 24. However, as distinguished from pulse counter 23, events counter 26 is gated "on" at the start of an analysis period and gated "off" only at the end of such analysis period which in most cases is a duration of tens, hundreds, or more cycles of the monitored voltage. The tabulated output of events counter 26 when displayed on digital recorder 25 serves as the time reference for determining, by identifying sequentially the number of events from a particular starting time, the location of any particular alternate half cycle or cycles to be further analyzed when an abnormal condition of the monitored wave is detected due to a recorded output from pulse counter 23.

The low frequency sampling rate provided by gating signals having a repetition rate of the fundamental frequency of the monitored voltage does not obtain an accurate analysis of the voltage deviation of the monitored wave shape since a recorded positive and, or, negative count from counter 23 merely indicates the average voltage value of the positive and, or, negative polarity deviation over a corresponding half cycle interval of the monitored voltage fundamental frequency. In order to obtain a more accurate analysis of the voltage deviation, and thereby determine the nature of the distortion (i.e., a harmonic or transient spike), a higher frequency sampling rate must be obtained. The higher frequency sampling rate is obtained in the reproduce mode of operation of tape recorder 20 by operating (gating on and off) pulse counter 23 at a rate higher than the fundamental frequency of the monitored voltage and conveniently this may be some higher order harmonic thereof. The higher operating rate of counter 23 (and counter 26) is achieved by disconnecting the gating signal input to the counters from the first position of switch 24, and connecting the input to the second position thereof. The second (lower) position of switch 24 is connected to the output of a square wave frequency multiplier circuit 27 having its input connected to the output of the channel on the tape recorder on which is stored the output of the axis crossing detector 21. The frequency multiplier 27 is thus also phase-locked with the monitored voltage and provides the necessary higher order harmonic frequency gating signals for operating counters 23 and 26. As one example, square wave frequency multiplier 27 provides square wave pulses having a repetition rate of five times the fundamental frequency of the monitored voltage. Thus, as indicated in FIG. 2, the fundamental frequency positive half cycle of the monitored voltage is divided into five equal increments, each representing a time measurement of $\frac{1}{10}$ of the fundamental frequency interval. Under these conditions, pulse counter 23 counts and displays on the digital recorder the number of pulses generated by the converters 13 and 14 during alternate half cycles defined by the frequency multiplier gating signals. Obviously, the pulse count still represents the average value of the voltage deviation or difference, but now such average value is only over a time interval corresponding to $\frac{1}{5}$ of a half cycle of the fundamental frequency of the monitored voltage, and it is clearly evident that this shorter time interval pulse count provides a much more accurate analysis of the voltage deviation. Thus, assuming the presence of a fifth harmonic distortion whether in phase with the fundamental frequency or not, such fifth harmonic distortion is detected and determined by noting symmetrical or equal pulse counts for each of the shorter duration alternate half cycle time intervals defined by the fifth harmonic frequency gating signals. The additional presence of a short duration transient spike 17 is detected by the additional pulse count in the short time interval of such transient (i.e., the spike transient destroys the symmetry of harmonic pulse count tabulation). In the case of no harmonic frequency distortion and only a single transient spike, such transient is detected by a pulse count existing only during the short time interval of such transient. The harmonic and transient spike distortions illustrated in FIG. 2 are obviously of a simplified type since the transient spike may very well overlap a part of two or even more counting intervals of the higher frequency determined by the frequency multiplier 27. Also, the harmonic distortion may be of a decaying type rather than constant amplitude as illustrated. Thus, analysis of the pulse counts over several half cycles of the fundamental frequency of the monitored wave and proportionally greater number of half cycles of the harmonic frequency may be required to obtain the desired accuracy. It should be understood that the output of component 27 need not be a specific higher order harmonic of the monitored voltage fundamental frequency but merely that it be a higher frequency and be phase-locked with the monitored voltage. Component 27 is preferably an adjustable frequency multiplier whereby a low frequency sampling rate (but higher than the monitored voltage fundamental) may be employed to locate a transient, particularly if of short duration, and then a higher frequency sampling rate is employed to analyze or measure the transient. Again, counter 26 serves as a time reference for determining, by identifying sequentially the number of events from a particular starting point, the location of the particular higher frequency half cycles being analyzed by means of the pulse counts from counter 23.

As a result of the description of my apparatus in FIG. 1 and with reference to FIG. 2, it can be appreciated that my apparatus provides a means for more accurately and automatically measuring the average value of the voltage deviations of a monitored voltage on a cycle by cycle basis. Further, my apparatus provides a means for automatically measuring the average value of the voltage deviations in increments of less than a half cycle duration. Finally, my apparatus provides a means for automatically measuring the duration of transient disturbances since the duration of a transient such as spike 17 may be measured by determining the number of short time intervals over which the tabulated higher pulse count of the transient is displayed on the digital recorder. In all cases the pulse count is proportional to the average value of the voltage deviation for the particular time increment being measured. Both the suppression of the fundamental frequency wave and the small incremental measurements result in increased accuracy in the measurement and analysis of the voltage deviation, and this technique is especially valuable for the analysis of short duration transients. As another example for a particular VFC, a triangular shaped transient of only 0.01 cycle duration on a 60 cycle per second monitored voltage provides a pulse count of 83 on a magnetic tape recorder operating at a tape speed of 60 inches per second when the peak transient voltage is equal to the rated VFC input voltage. A lower than rated VFC input voltage would result in a proportionally lower total pulse count. Thus, the pulse count is directly proportional to the magnitude of the voltage deviation in each measured time increment and the accuracy of the voltage wave shape analysis is essentially independent of variations in recorder tape speed or recording amplitude.

The higher frequency gating signals generated by frequency multiplier 27 may also be recorded on a separate channel of the tape recorder 20, if desired, however this is normally not necessary if the frequency multiplier is operated from the output of the axis crossing detector 21 and in phase therewith. The relation of record tape speed and reproduce tape speed depends on the reproduce count capability of the electronic pulse counter 23 and readout device 25. The greatest recording resolution and sensitivity is attained at the highest permissible tape speeds and employing the highest frequency rated VFC. The maximum record tape speed is determined by the minimum difference voltage that must be recorded and reproduced. As an example, utilizing a VFC rated 10 volts-100 kilocycles per second, a ten volt square pulse transient having a duration of 83 microseconds results in 8 pulses recorded on a tape speed of 15 inches per second and this would be within proper density and resolution capabilities of thin oxide tape wide band recorder characteristics.

Another method for measuring the duration of a transient is the use of another bipolar VFC having a common output connected to a fourth channel on tape recorder 20 wherein the voltage input rating of the VFC is low with respect to the expected peak voltage of the transient. Employing this technique, the VFC frequency output suddenly increases to the saturation frequency at the start of the transient and remains constant at such saturation frequency until the transient is completed irrespective of transient polarity or reversal in polarity. The total count on such fourth channel is then a measure of the transient duration. The peak voltage of such transient may be recorded on another channel of the tape recorder employing a capacitor that is charged by the transient and stored at the peak value until the next cycle at which time it is discharged into a VFC and recorded on the tape in terms of pulses.

The operation of the apparatus illustrated in FIG. 1 results in the analysis of only alternate half cycles of the monitored voltage wave and requires a pulse count of the +VFC output and a subsequent pulse count of the —VFC output. It is recognized that each half cycle of the monitored voltage wave may be analyzed by subsequently reversing the polarity of the gating signal input to counter 23, but this would then require additional steps and time for the analysis. Assuming that it is an object of the invention to minimize the analysis time, it is evident that the apparatus of FIG. 1 is limited to the analysis of only alternate half cycles of the monitored voltage wave and that two successive pulse counts must be tabulated on the digital recorder.

FIG. 3 illustrates a second embodiment of my invention wherein the components connected to the recording input of magnetic tape recorder 20 are identical with the components illustrated in FIG. 1 and therefore are not indicated in this or the following figures. The apparatus in FIG. 3 is distinguished from the apparatus in FIG. 1 in that the "pulse count polarity" selector switch 22 is not employed to alternately connect the outputs of channels 2 and 3 of the tape recorder to the input of electronic pulse counter 23. Instead, a first pulse counter 23 is connected to the output of channel 3 and a second pulse counter 23a is connected to the output of channel 2. The outputs of pulse counters 23 and 23a are connected to separate digital recorders 25 and 25a, respectively. Finally, a single events counter 26 is connected to the two digital recorders. Counters 23, 23a and 26 are all connected through switch 24 to a common source of gating signals which comprises the axis crossing detector 21 or the square wave frequency multiplier 27.

The apparatus of FIG. 3 is operable in either of two modes. In mode 1, it is assumed that pulse counters 23 and 23a are each gated on by the same polarity-going slope of a square wave gating pulse (or same polarity short duration pulse as illustrated by the two upper pulses of positive polarity in FIG. 3) whereby counters 23 and 23a count simultaneously in the reproduce mode of the tape recorder over alternate half cycles of the fundamental frequency of the monitored voltage. In like manner, in the second (lower) position of switch 24, simultaneous counts are developed over alternate half cycles at the higher frequency sampling rate. Further descriptions of the apparatus operation in the second position of switch 24 will not be made since it is similar to the operation previously described.

In mode 2, it is assumed that pulse counters 23 and 23a are gated on by opposite polarity-going slopes of square wave gating pulses (or opposite polarity short duration pulses as illustrated by the two larger pulses) whereby counters 23 and 23a do not count simultaneously, but rather alternately, one of the counters counting over the positive polarity half cycles of the fundamental frequency of the monitored voltage, and the other counter counting over the negative polarity half cycles. It is assumed in all of these cases that the digital recorder employed is only capable of printing out one average value of difference voltage pulse count at a time. A more sophisticated and expensive digital recorder capable of printing out two such pulse counts simultaneously would obviously result in the elimination of one of the digital recorders in the mode 1 operation.

The FIG. 3 embodiment has the advantage of faster operation over the FIG. 1 embodiment since the additional step of a subsequent count in a second position of switch 22 is eliminated. The mode 1 operation of the FIG. 3 embodiment is probably preferred since counters 23 and 23a count simultaneously over the same half cycles for alternate half cycles of the monitored voltage whereas in the mode 2 operation the counters do not count over the same half cycles, but rather count successively over alternate half cycles. Thus, the bipolarity counts tabulated over the same alternate half cycles in the mode 1 operation is more meaningful since it provides the necessary bipolarity information for determining the difference voltage.

FIG. 4 illustrates a third embodiment of my invention which is distinguished from the FIGS. 1 and 3 embodiments in that selector switch 22 is employed to connect the input of two electronic pulse counters 23 and 23a alternately from the outputs of channels 2 and 3 of the tape recorder. Counters 23 and 23a are gated on by the indicated opposite polarity gating signals such that the counters do not count simultaneously, but rather count over alternate half cycles. Accordingly, the counters 23 and 23a count the output of a first VFC over each half cycle of the monitored voltage in a first position of switch 22, and the output of the second VFC over each half cycle in the second position of switch 22.

The FIG. 4 embodiment has the advantage over the FIG. 3 embodiment of providing more complete information since it tabulates bipolarity counts over each half cycle of the monitored voltage. However, the FIG. 4 apparatus requires the addition step of subsequent counting in the second position of switch 22 as in the FIG. 1 case.

FIG. 5 illustrates a fourth embodiment of my invention which is adapted for providing complete measurement and analysis of the monitored voltage wave in a minimum of time but wtih the maximum number of components. The outputs of channels 2 and 3 of the tape recorder are each connected to the inputs of two electronic pulse counters gated on by opposite polarity gating signals, and since no switch 22 is employed, it is evident that the four counters provide a simultaneous count of both the positive and negative voltage deviations over each positive and each negative half cycle of the monitored voltage wave. Pulse counters 23 and 23a are gated on by opposite polarity gating signals as indicated, and are connected to the output of channel 2. The outputs of counters 23 and 23b are connected to a common input of digital recorder 25 since counters 23 and 23b count simultaneously during the same alternate half cycles. In like manner, pulse counters 23b and 23c are also gated on by opposite polarity gating signals and are connected to the output of channel 3. The outputs of counters 23a and 23c are connected to a common input of digital recorder 25a. Recorders 25 and 25a thus display pulse counts corresponding to the positive and negative polarity component, respectively, of the difference voltage for each half cycle of the monitored voltage wave.

FIG. 6 illustrates a fifth embodiment of my invention which is of the simplest design but limited in its capabilities to measuring only factors such as total harmonic content or total voltage deviation. Thus, the exact nature of the distortion in the monitored wave shape cannot be determined from this embodiment. Only one VFC 13a is employed in this embodiment, and such VFC has a bipolarity input and a single output. Thus, VFC 13a generates pulses for all deviations of the monitored voltage from the reference wave shape irrespective of the polarity of the voltage deviation. These pulses are recorded on tape recorder 20 and subsequently reproduced and supplied to electronic pulse counter 23 and the count of the pulses displayed on digital recorder 25. The higher frequency sampling rate provided by frequency multiplier 27 permits an analysis of the total deviation over shorter intervals of time corresponding to a particular fraction of a half cycle of the monitored voltage, however, such higher frequency sampling rate also detects only the total voltage deviation over the shorter interval sampling time. The apparatus in this FIG. 6 embodiment utilizes a minimum number of components since it employs only one VFC and does not utilize switch 22.

It is apparent from the foregoing that my invention attains the objectives set forth. The apparatus in the various embodiments illustrated is capable of accurately and automatically measuring the average value of the voltage deviations from a reference wave shape representing the monitored voltage under normal or ideal conditions on a cycle-by-cycle basis. My invention also automatically measures the average value of the voltage deviations in time increments of less than a half cycle duration and this latter capability is also adapted for measuring the duration of transient disturbances. The increased accuracy of the measurement and analysis produced by my invention is due to the suppression of the fundamental frequency of the monitored wave and the use of a higher frequency sampling rate which provides measurement and analysis over small time increments.

While five specific embodiments of my invention have been described, the invention is not limited thereto since modifications may be made by one skilled in the art. For example, an adjustable phase shifter or time gating delay component may be switched into the circuit between the output of frequency multiplier 27 and switch 24 to aid in the wave analysis. The appended claims are intended to cover all such modifications as fall within the true spirit and scope of the invention.

What I claim as new and desire to secure by Letters Patent of the United States is:

1. Electrical apparatus for the measurement and analysis of voltage waves comprising:
    means connected to a source of voltage waves being monitored for generating reference voltage waves of wave shape and amplitude corresponding to the normal condition of the monitored voltage waves and phase locked therewith,
    means for comparing the reference and monitored voltage waves at successive time intervals to produce a difference voltage indicative of voltage deviation of the monitored voltage waves from a normal condition thereof,
    means connected to an output of said comparing means for generating a plurality of electrical pulses where the number of pulses is directly proportional to the magnitude of the difference voltage,
    means for recording and subsequently reproducing the plurality of electrical pulses,
    means for counting the plurality of electrical pulses reproduced by said recording and reproducing means over half cycle intervals at the frequency of the monitored voltage, and
    means for operating said pulse counting means at a frequency higher than the fundamental frequency of the monitored voltage to thereby count the pulses over shorter intervals of time corresponding to a fraction of a half cycle of the monitored voltage fundamental frequency to thereby obtain a more accurate analysis of the deviations of the monitored voltage waves from the normal conditions thereof, each pulse count being directly proportional to the average value of the magnitude of the difference voltage over the corresponding pulse counting interval.

2. The apparatus set forth in claim 1 wherein the apparatus is adapted for the measurement and analysis of alternating current voltages and wherein:
    said reference voltage generating means comprise a sine wave oscillator phase-locked with the monitored voltage for providing a sine wave shape voltage having a peak amplitude equal to the peak amplitude of the monitored voltage under ideal conditions thereof.

3. The apparatus set forth in claim 1 wherein:
    said recording and reproducing means comprises a wide band, multi-channel magnetic tape recorder.

4. The apparatus set forth in claim 1 and further comprising:
    means connected to the source of monitored voltage waves for generating gating signals at the fundamental frequency of the monitored voltage and phase locked therewith for gating said pulse counting means alternately "on" and "off" for half cycle intervals at the monitored voltage frequency, said pulse counting means operable in the counting mode over each half cycle "on" interval and being reset to zero during each half cycle "off" interval.

5. The apparatus set forth in claim 4 wherein said fundamental frequency gating signal generating means comprises:
    an axis crossing detector phase-locked to the monitored voltage for providing the fundamental frequency gating signals.

6. The apparatus set forth in claim 4 wherein:
    said higher frequency pulse counting operating means comprises a gating signal generator adapted to generate gating signals at the higher frequency for gating said pulse counting means alternately "on" and "off" for half cycle intervals at the higher frequency, said pulse counting means operable in the counting mode over each half cycle "on" interval and being reset to zero during each half cycle "off" interval, and
    means for switching a gating signal input of said pulse counting means from the output of said fundamental frequency gating signal generating means to the output of said higher frequency gating signal generator to thereby initiate the higher frequency operation of said pulse counting means.

7. The apparatus set forth in claim 6 and further comprising:
    means for tabulating and displaying successive pulse counts developed by said pulse counting means.

8. The apparatus set forth in claim 7 and further comprising:
    means for counting the gating signal on-off intervals representing all of the half cycle events generated by said fundamental frequency and higher frequency gating signal generating means during a particular voltage wave analysis period, output of said gating signal counting means in communication with said tabulating and displaying means for identifying sequentially the number of half cycle events from the starting point of the particular analysis period to thereby provide a time reference for locating any particular half cycle events to be further analyzed.

9. The apparatus set forth in claim 1 wherein:
    said pulse generating means comprise a voltage-to-frequency converter for converting the difference voltage to the plurality of pulses wherein the repetition rate thereof is directly proportional to the magnitude of the difference voltage.

10. The apparatus set forth in claim 1 wherein:
    said pulse generating means comprise a pair of polarity-sensitive voltage-to-frequency converters of opposite polarity for converting the difference voltage of positive polarity to a first plurality of the pulses and the difference voltage of negative polarity to a second plurality of the pulses wherein the repetition rates thereof are directly proportional to the magnitude of the respective polarity difference voltages.

11. The apparatus set forth in claim 10 wherein:
    said recording and reproducing means is provided with a first channel for recording and reproducing the pulses corresponding to the difference voltage of positive polarity and a second channel for recording and reproducing the pulses corresponding to the difference voltage of negative polarity.

12. The apparatus set forth in claim 11 wherein:
    said pulse counting means comprises only a single electronic pulse counter connected to an output of said recording and reproducing means.

13. The apparatus set forth in claim 11 wherein:
    said pulse counting means comprise two electronic pulse counters connected to two outputs of said recording and reproducing means.

14. The apparatus set forth in claim 11 and further comprising:
    switch means for selectively connecting the input to said pulse counting means from said first or second channel in the reproduce operating mode of said recording and reproducing means.

15. Electrical apparatus for the measurement and analysis of voltage waves comprising:

means connected to a source of monitored voltage waves for comparing a monitored voltage wave to a reference voltage wave, means connected to an output of said voltage wave comparing means for generating electrical pulses responsive only to voltage deviations of the monitored wave from the reference wave during a predetermined time interval, means connected to an output of said pulse generating means for counting and displaying the counts of the numbers of pulses generated at a first sampling rate corresponding to half cycles of the fundamental frequency of the monitored voltage during a first time interval, the pulse counts being directly proportional to the average value of the voltage deviation of the monitored voltage wave from the reference voltage wave over the corresponding half cycle intervals, and means including a frequency multiplier circuit for counting and displaying the counts of the numbers of pulses generated at a second sampling rate corresponding to half cycles of frequency higher than the fundamental frequency of the monitored voltage by the multiple established by said frequency multiplier circuit during a second time interval subsequent to the first time interval, the pulse counts at the second sampling rate being over shorter intervals of time corresponding to half cycles of the higher frequency to thereby obtain an accurate measurement and analysis of the monitored voltage wave wherein the accuracy results from the suppression of the fundamental frequency monitored voltage wave and the small time incremental measurements provided by the higher frequency sampling rate.

16. Electrical apparatus for the measurement and analysis of voltage waves comprising:

a sine wave oscillator connected to a source of alternating-current voltage waves being monitored and thereby phase-locked therewith for generating reference voltage waves of wave shape corresponding to the ideal condition of the monitored voltage waves, an electrical comparator circuit for comparing the amplitude of the reference voltage waves and the amplitude of the monitored voltage waves to produce a polarity-sensitive difference voltage indicative of voltage deviation of the monitored voltage waves from the reference voltage waves, the ideal condition monitored voltage waves being suppressed at the output of said comparator circuit, a pair of voltage-to-frequency converters having opposite polarity inputs connected to the output of said comparator circuit, said converters generating electrical pulses wherein the repetition rates of the pulses are directly proportional to the magnitudes of the polarity-sensitive difference voltage, a multichannel record and reproduce device, the output of the positive polarity input voltage-to-frequency converter connected to a first record channel input of said device and the output of the negative polarity input voltage-to-frequency converter connected to a second record channel input, means connected to the source of monitored voltage waves for generating gating signals of the fundamental frequency of the monitored voltage waves and phase-locked therewith, output of said fundamental frequency gating signal generating means connected to a third record channel input of said device, a first electronic pulse counter connected to an output of at least one of the first and second channels of said device, switching means having first and second inputs thereof selectively connected to an output thereof, the output of said switching means connected to the gating signal input of said first pulse counter, the first input of said switching means connected to an output of the third channel of said device whereby said first pulse counter is gated alternately on and off for half cycle intervals at the fundamental frequency of the monitored voltage waves in the reproduce mode of operation of said device, said first pulse counter reset to zero during each half cycle off interval, each pulse count being directly proportional to the average value of the magnitude of the bi-polarity difference voltage over the corresponding fundamental frequency alternate half cycle pulse counting interval, means for displaying the successive tabulated pulse counts developed at the output of said first pulse counter, a second electronic pulse counter, the output of said switching means connected to the gating signal input of said second pulse counter whereby said second pulse counter is operable with said first pulse counter, said second pulse counter gated on at the beginning of a particular voltage wave monitoring period and adapted for counting the gating signal on-off interval events during the monitoring period, output of the second pulse counter connected to said displaying means for identiying sequentially the interval events from the beginning of the particular monitoring period to thereby provide a time reference for locating any particular half cycle events to be further analyzed, and means for generating gating signals at a frequency higher than the monitored voltage fundamental frequency, the second input of said switching means connected to an output of said higher frequency gating signal generating means whereby the gating signal inputs are provided with the monitored voltage fundamental frequency gating signals during the monitoring period and are provided with the higher frequency gating signals during an analysis period wherein the pulse counting rate is at the higher frequency to thereby count and tabulate the pulses over correspondingly shorter time intervals.

References Cited

UNITED STATES PATENTS

| 3,201,781 | 8/1965 | Holland | 340—347 |
| 3,431,492 | 3/1969 | James et al. | 324—102 |

E. E. KUBASIEWICZ, Primary Examiner

U.S. Cl. X.R.

328—151